United States Patent [19]
Ibe

[11] Patent Number: 5,899,486
[45] Date of Patent: May 4, 1999

[54] AIR BAG DEVICE

[75] Inventor: Shoichi Ibe, Aichi-ken, Japan

[73] Assignee: Kabushiki Kaisha Tokai-Rika-Denki-Seisakusho, Niwa, Japan

[21] Appl. No.: 08/820,388

[22] Filed: Mar. 12, 1997

[30] Foreign Application Priority Data

Mar. 25, 1996 [JP] Japan .................................. 8-068656

[51] Int. Cl.⁶ .................................................. B60R 21/16
[52] U.S. Cl. ..................................... 280/728.2; 280/730.2
[58] Field of Search ............................... 280/728.2, 730.2

[56] References Cited

U.S. PATENT DOCUMENTS

| | | | |
|---|---|---|---|
| 5,265,903 | 11/1993 | Kuretake et al. | 280/730.2 |
| 5,322,322 | 6/1994 | Bark et al. | 280/730.2 |
| 5,333,898 | 8/1994 | Stutz | 280/730.2 |
| 5,470,103 | 11/1995 | Vaillancourt et al. | 280/730.2 |

FOREIGN PATENT DOCUMENTS

| | | |
|---|---|---|
| 41 37 749 A1 | 5/1993 | Germany . |
| 43 07 175 A1 | 9/1993 | Germany . |
| 195 47 494 A1 | 7/1997 | Germany . |
| 6-227340 | 8/1994 | Japan .................. 280/730.2 |
| WO 94/19215 | 9/1994 | WIPO . |

*Primary Examiner*—Kenneth R. Rice
*Attorney, Agent, or Firm*—Oliff & Berridge, PLC

[57] ABSTRACT

There is provided an air bag device in which a bag body can be inflated smoothly in a predetermined form and reduction in cost can be achieved. The air bag device includes an elongated bag body and a wire passes through the bag body along a longitudinal direction of the bag body. The wire is supported movably by a plurality of mounting hardwares. Each mounting hardware passes through slits, which are formed in the bag body and in a cover with the bag body being accommodated therein, to project outward and is fixed at a predetermined position by a bolt. A widthwise dimension of the mounting hardware is made shorter than a longitudinal dimension of each of the slits. For this reason, when the bag body inflates, the bag body suitably moves along the mounting hardwares and tensile force acting in the longitudinal direction of the bag body due to an internal pressure of the bag body at the time of inflation is thereby made uniform. Accordingly, the bag body can smoothly inflate to expand in accordance with a predetermined expanding progress.

19 Claims, 6 Drawing Sheets ns 5,899,486

AIR BAG DEVICE

BACKGROUND OF THE INVENTION

1. Field of the Invention

The present invention relates to an air bag device installed in a vehicle.

2. Description of the Related Art

As a so-called side-impact air bag device which is provided on an inner side of a side wall of a vehicle body and detects pressure or the like applied from a lateral direction of the vehicle body to inflate a bag body toward an interior of the vehicle body, for example, there has been proposed the type of air bag device to be mounted on the vehicle body from a front pillar to a center pillar along a roof side.

Namely, as shown in FIG. 5, an air bag device 80 of this type includes a cover 84 whose longitudinal direction coincides with that of a vehicle body 82 (i.e., the direction indicated by arrow B in FIG. 5). The cover 84 is disposed adjacently to the vehicle body 82 from a front pillar 86 to a center pillar 88 along a roof side 90 and is provided to be expandable into a predetermined form due to internal pressure applied from an inner side of the cover 84. Further, as shown in FIG. 6, a bag body 92 in a folded state is accommodated within the cover 84. The bag body 92 is formed so that its longitudinal direction coincides with the longitudinal direction of vehicle body 82 (i.e., the direction indicated by arrow B in FIG. 6). When gas is blown off from a module 94 provided in the center pillar 88 into the bag body 92, the bag body 92 presses against the cover 84 from the inner side thereof while swelling so as to cause the cover 84 to expand, and the bag body 92 further inflates to expand toward the interior of the vehicle body 82 into a predetermined form (the state shown in FIG. 5).

On the other hand, the bag body 92 of the air bag device 80 is ordinarily provided with a plurality of tongue-shaped mounting portions 96. The plurality of mounting portions 96 are formed along the longitudinal direction of the bag body 92 at predetermined intervals and are provided to respectively project out of the cover 84 so as to be fixed by fitting parts (not shown) such as bolts to the front pillar 86, roof side 90, and center pillar 88. As a result, the air bag device 80 can be installed at a predetermined position on the vehicle body 82.

However, in the air bag device 80 mounted in the above-described manner, since the bag body 92 is held by only these mounting portions 96, it is difficult for tensile force $F_1$ through $F_7$ between the mounting portions 96, which is caused by the internal pressure of the bag body 92 when the bag body 92 inflates, to coincide with one another. As a result, the expanding progress of the bag body 92 (i.e., the progress of a change in the shape of the bag body 92 from a folded state to a completely expanded state) is different from a previously-set expanding progress, and there is a possibility that an undesirable state such as "slack" (the state indicated by the two-dot chain line in FIG. 5) is caused in the bag body 92 during expansion of the bag body 92 up to the completely expanded state.

In order to overcome the problem like the above, there can be considered methods: the number of mounting portions 96 may be increased; the bag body 92 may be uniformly fixed to the vehicle body 82 along the longitudinal direction thereof; and the like. However, in these methods, the number of fitting parts such as bolts increases and the number of processes for fixing the bag body 92 also increases, thereby resulting in increase in cost.

Further, in the air bag device 80, since the interval between the mounting portions 96, or the like changes in accordance with the shape of the vehicle body 82, component members such as the bag body 92 should be prepared independently for each of vehicle types, which becomes an impediment to a reduction in cost.

SUMMARY OF THE INVENTION

In view of the above-described circumstances, it is an object of the present invention to provide an air bag device which allows a bag body to inflate smoothly into a predetermined form and also allows reduction in cost.

The present invention is an air bag device which comprising a bag body having an elongated configuration and disposed on an inner side of a vehicle body, the bag body inflating to be elongated in a predetermined direction due to pressure of gas blown into the bag body; and a bag body supporting portion which supports the bag body with respect to the vehicle body so that the bag body can be moved in a predetermined range.

In accordance with the present invention, the bag body is mounted on the vehicle body via the bag body supporting portion, and when internal pressure generated by gas acts on an inner portion of the bag body at the time of inflation of the bag body, the bag body is suitably moved with respect to the vehicle body. As a result, tensile force acting in the longitudinal direction of the bag body at the time of inflation is made uniform along the longitudinal direction of the bag body, and the bag body can reliably inflate to expand smoothly in accordance with a predetermined expanding progress. For this reason, it is possible to reliably overcome a drawback such that a slack is partially formed in the bag body at the time of inflation.

In this case, the bag body supporting portion may include a wire of which end portions are both fixed to the vehicle body and which supports the bag body continuously along the longitudinal direction of the bag body, slits formed in the bag body and extending in the longitudinal direction of the bag body, and a mounting member which passes through the slits so as to be relatively movable along the slits and with respect to the bag body and holds the wire within the bag body in a relatively movable manner, the mounting member projecting out of the bag body and being fixed to the vehicle body. As a result, the bag body is supported by the wire continuously along the longitudinal direction thereof and the wire is supported by the mounting member passing through the slits of the bag body and mounted on the vehicle body. Namely, the bag body is mounted on the vehicle body via the wire and the mounting member.

Here, the bag body is supported by the wire continuously along the longitudinal direction thereof and the mounting member is provided to be relatively movable with respect to the bag body and along the slits, and therefore, when pressure of gas acts on the inner portion of the bag body at the time of inflation of the bag body, the bag body is suitably moved along the slits and with respect to the mounting members (i.e., with respect to the vehicle body at which the mounting member is mounted). As a result, the tensile force acting in the longitudinal direction of the bag body at the time of inflation is made uniform along the longitudinal direction of the bag body so that the bag body reliably inflates to expand smoothly in accordance with a predetermined expanding progress. For this reason, it is possible to reliably overcome a drawback such that a slack is partially formed in the bag body at the time of inflation.

Further, since the mounting member is provided to be movable along the slits and with respect to the bag body, the mounting member is, while being moved along the slits so as to correspond to a mounting position determined in accordance with the shape of the vehicle body, mounted at the mounting position. For this reason, the same air bag device can be installed on vehicle bodies having different mounting positions at which the mounting members are mounted.

In addition, the bag body is in itself supported by the wire and is supported by the mounting member via the wire. For this reason, it suffices the mounting member may support the wire, and therefore, the air bag device can be mounted on the vehicle body by a small number of mounting members.

As described above, in the present invention, the bag body is mounted on the vehicle body continuously along the longitudinal direction thereof in such a manner as to be movable with respect to the vehicle body in a predetermined range, and therefore, the bag body can be smoothly inflated to expand in accordance with a predetermined expanding progress. Further, the number of parts used to support the bag body can be substantially reduced and the same parts can be applied to a different kind of vehicle, thereby resulting in sharp reduction in cost.

DESCRIPTION OF THE PREFERRED EMBODIMENTS

Figure 3:
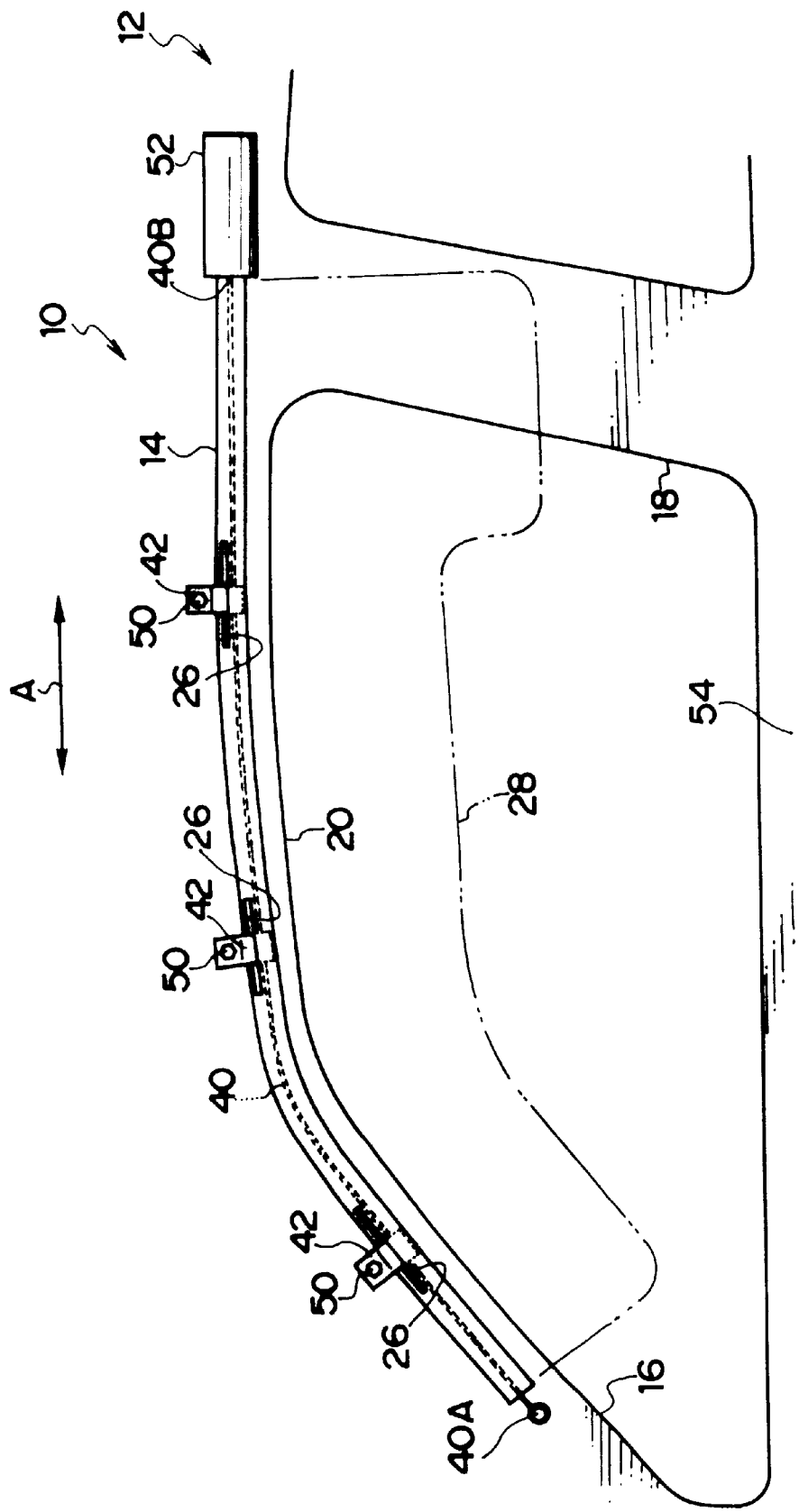
FIG. 3 is a side view when seen from an interior of a vehicle body showing a state in which the air bag device according to the embodiment of the present invention is installed.

FIG. 3 is a schematic view of a vehicle body 12 to which an air bag device 10 according to an embodiment of the present invention is applied.

As shown in FIG. 3, the air bag device 10 includes a cover 14. The cover 14 is formed as a cylindrical member whose longitudinal direction coincides with that of the vehicle body 12 (i.e., the direction indicated by arrow A in FIG. 3) and is disposed adjacently to an interior side of the vehicle body 12 along a roof side 20 from a front pillar 16 to a center pillar 18.

Figure 1:
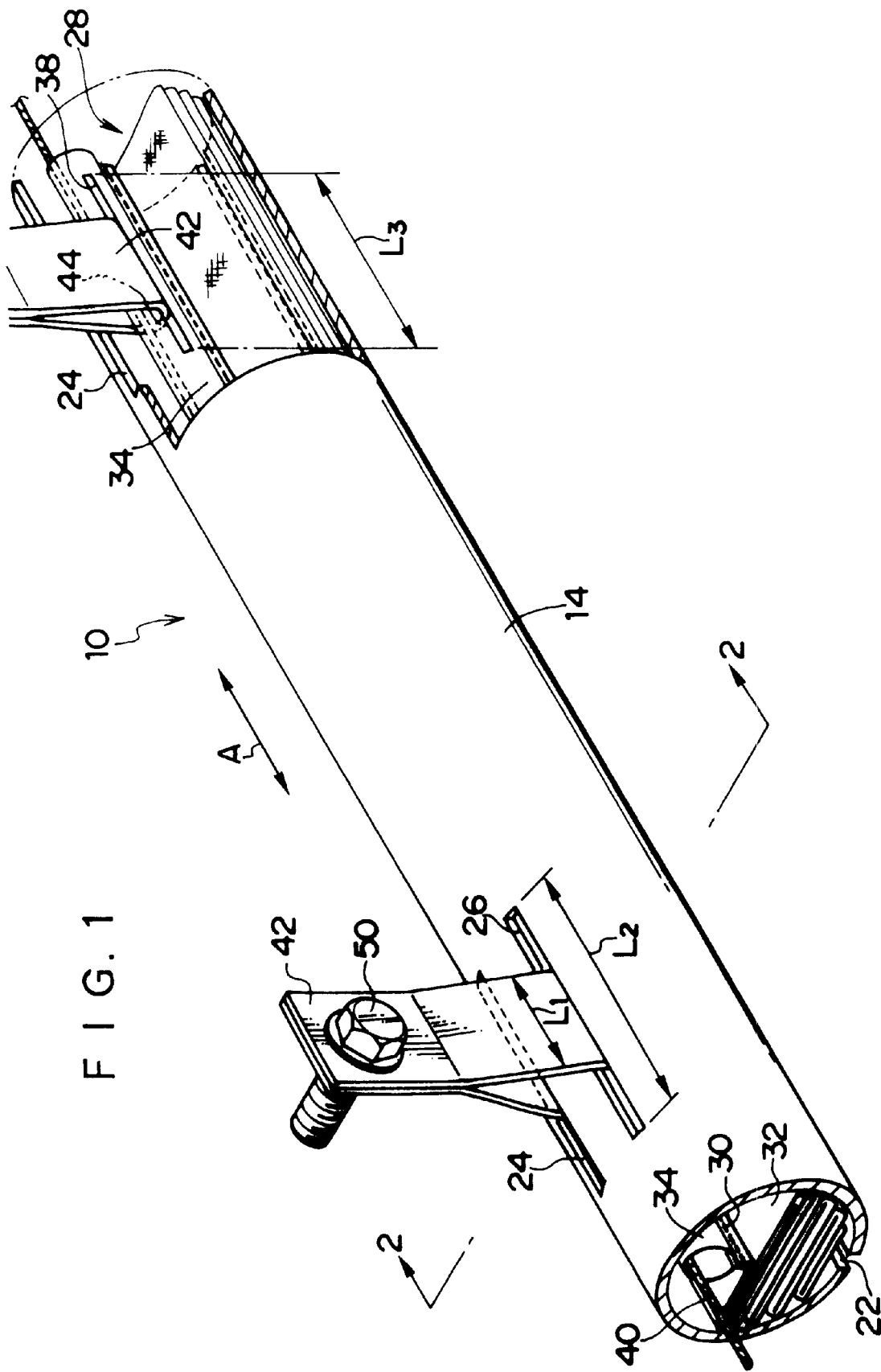
FIG. 1 is a perspective view of a principal portion of an air bag device according to an embodiment of the present invention.
Figure 2:
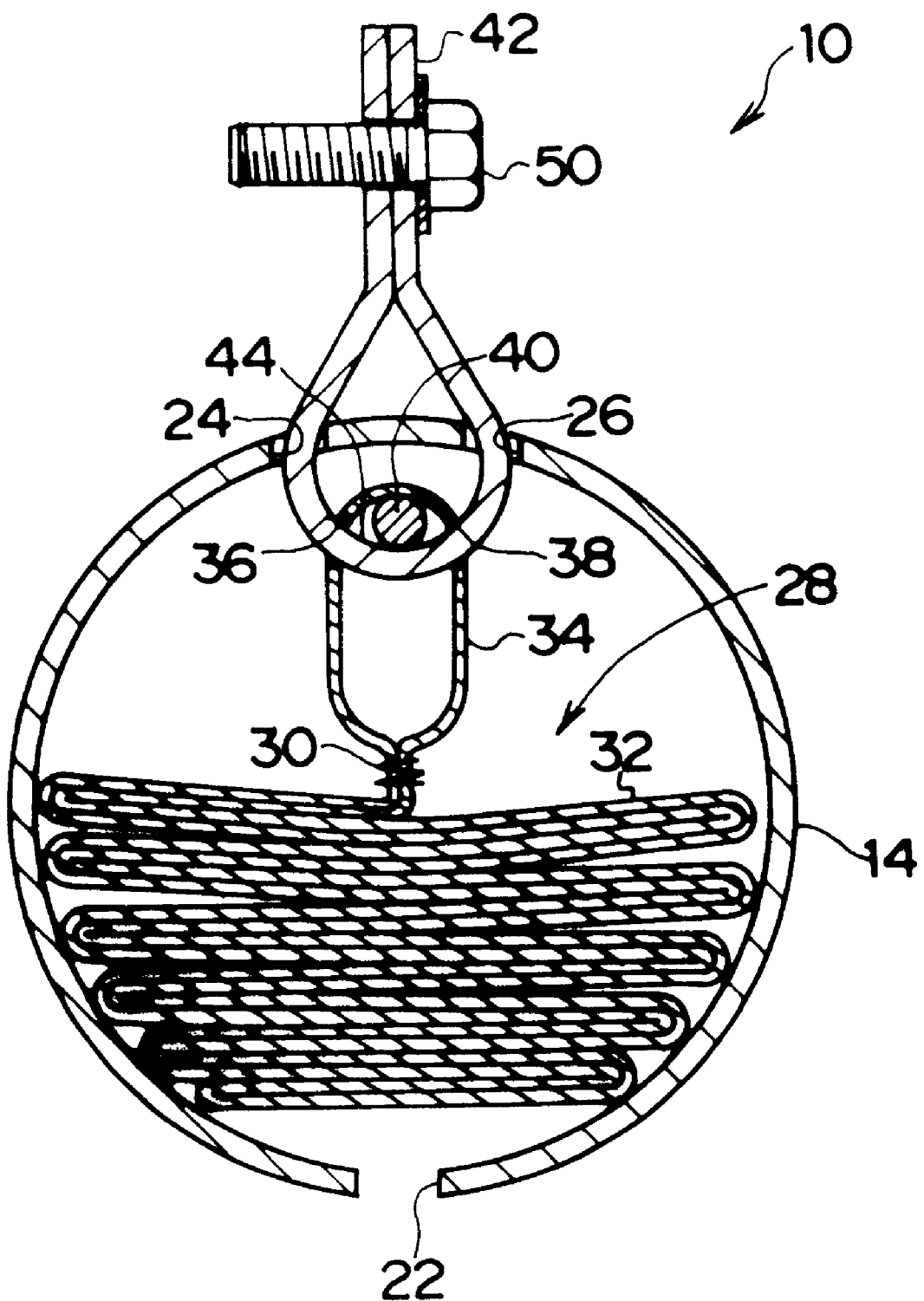
FIG. 2 is a cross-sectional view taken along the lines 2—2 in FIG. 1.
Figure 4:
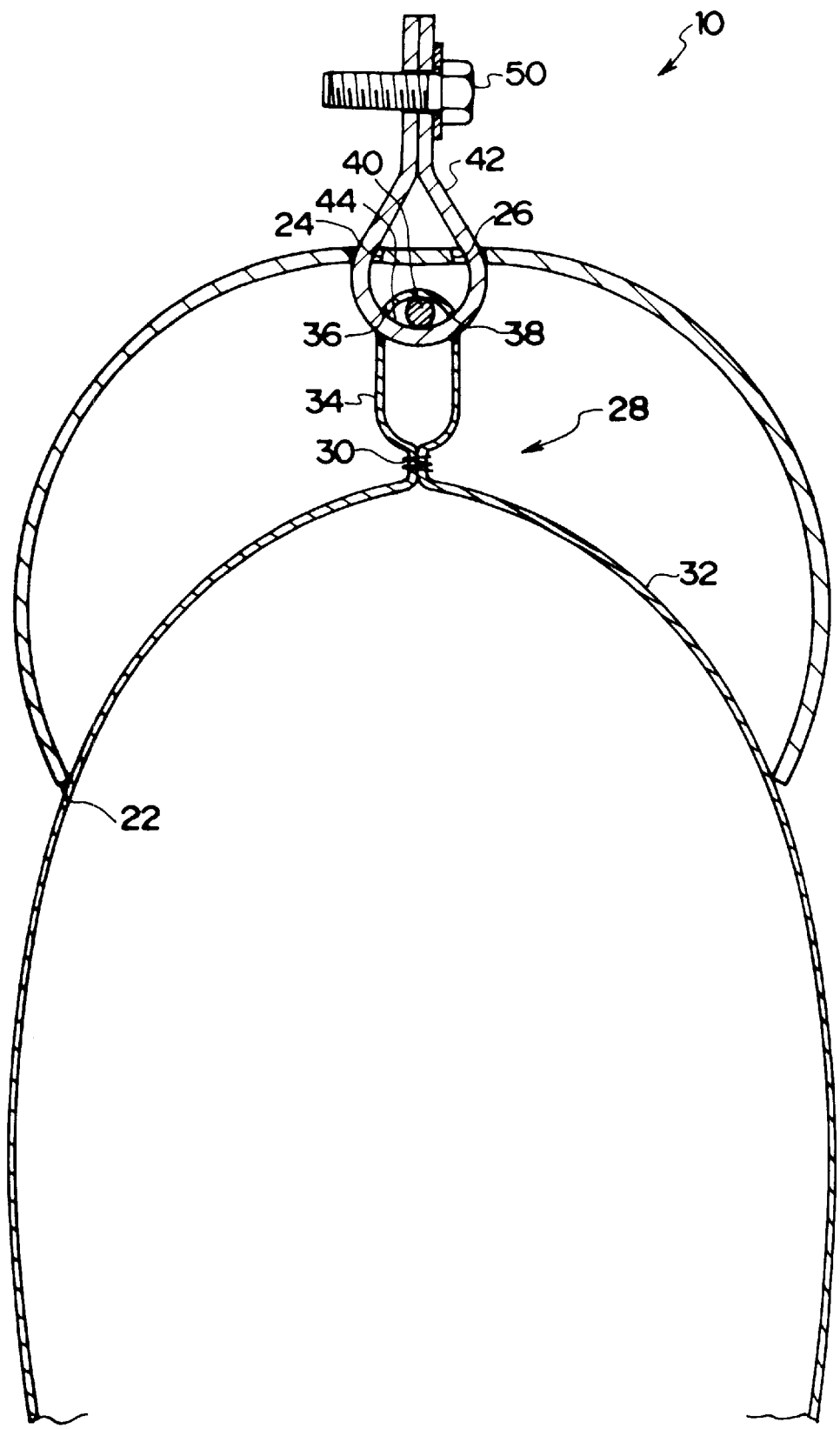
FIG. 4 is a cross-sectional view corresponding to FIG. 2, which shows an expanded state of a bag body.
Figure 5:
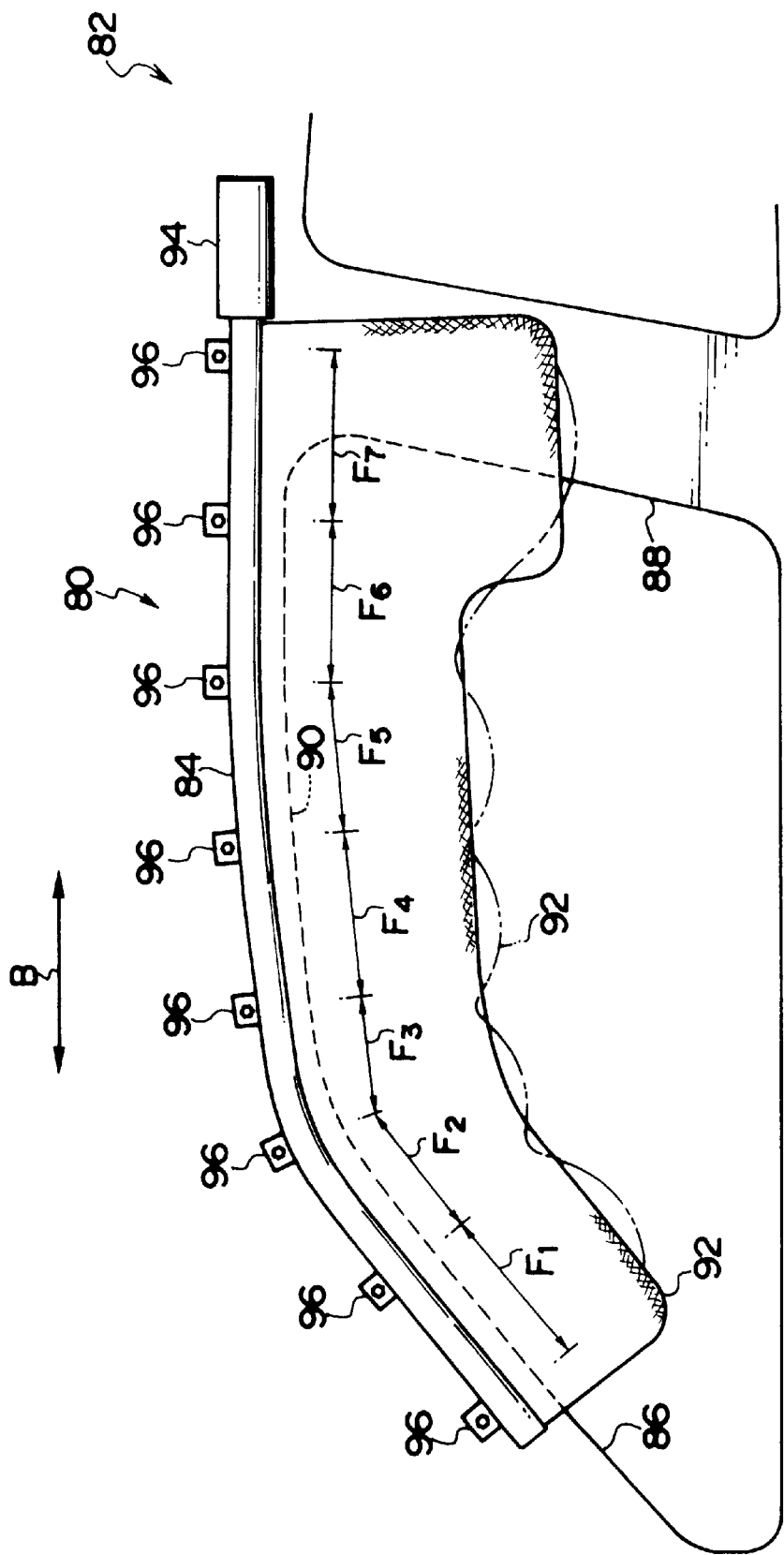
FIG. 5 is a side view when seen from an interior of a vehicle body showing a state in which a conventional side-impact air bag device is installed.
Figure 6:
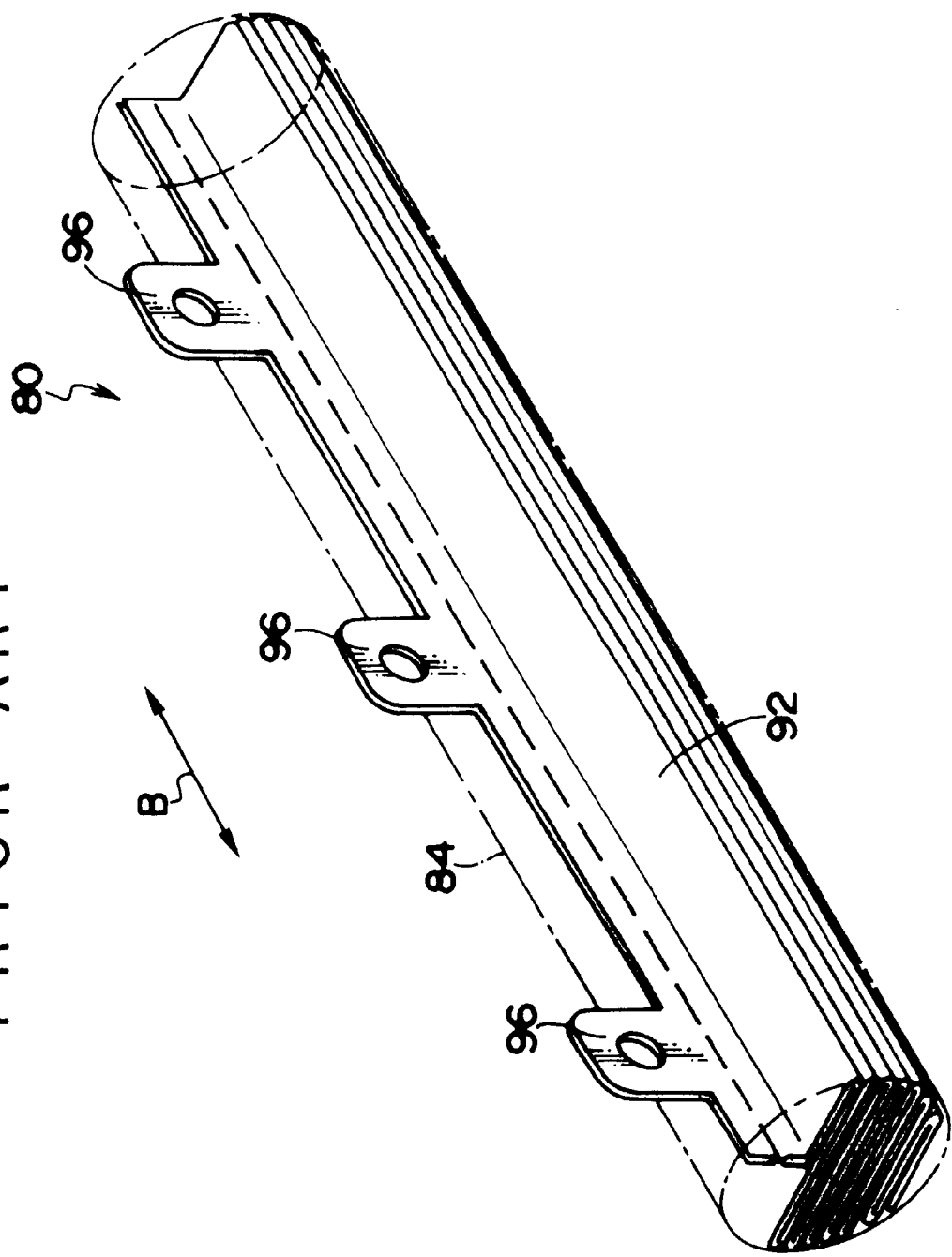
FIG. 6 is an enlarged perspective view of the conventional side-impact air bag device.

Referring now to FIGS. 1 and 2, the cover 14 is provided with a notching portion 22 formed along the longitudinal direction of the cover 14. The notching portion 22 is formed to be opened facing a lower side of the vehicle body 12. When a predetermined pressure is applied from an inner side of the cover 14, the notching portion 22 is further opened to expand the cover 14 (the state shown in FIG. 4).

Further, as shown in FIGS. 1 and 2, a plurality of pairs of slits 24, 26 are formed in the cover 14. These pairs of slits 24, 26 are each formed in that the longitudinal direction thereof coincides with that of the cover 14 and provided adjacently to each other along a circumferential direction of the cover 14. In addition, the pairs of slits 24, 26 are formed intermittently along the longitudinal direction of the cover 14 at predetermined intervals in such a manner as to face the notching portion 22.

A bag body 28 is accommodated within the cover 14. The bag body 28 is formed as a bag-shaped member whose longitudinal direction coincides with that of the vehicle body 12 and is divided into an expanding portion 32 and a cylindrical portion 34 by a sewn-together portion 30 uniformly formed along the longitudinal direction of the bag body 28. The expanding portion 32 is folded in such a manner as to be inflatable and expandable in a predetermined shape (the state shown in FIG. 4 and the state indicated by the two-dot chain line in FIG. 3) due to gas being fed into the expanding portion 32.

The cylindrical portion 34 is formed to be opened at both end portions in the longitudinal direction of the bag body 28. Further, a plurality of pairs of slits 36, 38 are formed in the cylindrical portion 34. These pairs of slits 36, 38 are each provided in that the longitudinal direction thereof coincides with that of the bag body 28 and formed adjacently along the circumferential direction of the cylindrical portion 34. In addition, the pairs of slits 36, 38 are formed intermittently along the longitudinal direction of the bag body 28 at predetermined intervals in such a manner as to respectively correspond to the pairs of slits 24, 26 formed in the cover 14.

Further, a wire 40 is disposed to pass through the cylindrical portion 34 and the longitudinal direction of the wire 40 coincides with that of the vehicle body 12. One end portion 40A of the wire 40 is fixed to the front pillar 16 and another end portion 40B is fixed to the center pillar 18. The wire 40 is held by mounting hardwares 42 which are each provided, as a mounting member, within the cylindrical portion 34 in a state of being bent conforming to the shape of the cover 14.

The mounting hardware 42 is as a whole formed in the shape of a loop and the wire 40 is supported by a bottom portion 44 of the mounting hardware 42 in a relatively slidable manner. The mounting hardware 42 passes through the slits 36, 38 and the slits 24, 26 formed in the cover 14 from an inner side of the cylindrical portion 34 and an upper end of the mounting hardware 42 projects out of the cover 14.

As shown in FIG. 1, a widthwise dimension $L_1$ of the mounting hardware 42 is made shorter than a length $L_2$ of the slits 24, 26 and a length $L_3$ of the slits 36, 38 and the mounting hardware 42 is provided to be relatively movable along the slits 24, 26 and the slits 36, 38.

Further, these mounting hardwares 42 are fixed to the front pillar 16, the roof side 20, and the center pillar 18 by bolts 50, respectively. As a result, the wire 40 is supported by the mounting hardwares 42 along the shape of the cover 14, and the bag body 28 and the cover 14 (i.e., the air bag device 10) are mounted at the inner side of the vehicle body 12 adjacently to the vehicle body 12.

On the other hand, a module 52 is disposed adjacent to the bag body 28 in the vicinity of an upper end portion of the center pillar 18. Accommodated within the module 52 are a starting device, a detonator, a gas generating material, and the like. A large quantity of gas generated within the module 52 is fed into the bag body 28 (i.e., the expanding portion 32). Further, the module 52 is connected to a sensor (not shown) provided in a door panel 54 of the vehicle body 12, and when pressure or impact of a predetermined condition which is applied from an exterior of the vehicle body 12 is detected by a sensor, the starting device operates to generate gas.

Next, an operation of the present embodiment will be described.

In the air bag device 10 of the present invention, when pressure or impact of a predetermined condition from the side portion of the vehicle body 12 is applied to the door panel 54 and is detected by a sensor (not shown) provided in the door panel 54, the starting device provided within the module 52 operates to ignite the detonator. As a result, the gas generating material is burnt so that a large quantity of gas is generated within the module 52, and the generated gas is blown off into the expanding portion 32 of the bag body 28. In this state, the expanding portion 32 inflates within the cover 14 to push to open the cover 14 from the inner portion, and the cover 14 is thereby opened from the notching portion 22. As a result, the bag body 28 (i.e., the expanding portion 32) can inflate to expand in a predetermined form (i.e., the state indicated by the two-dot chain line in FIG. 3) within the vehicle body 12.

The bag body 28 is supported by the wire 40 over an entire region thereof in the longitudinal direction. Further, the widthwise dimension $L_1$ of the mounting hardware 42 is made shorter than the length $L_3$ of the slits 36, 38 of the bag body 28 (i.e., the cylindrical portion 32) and the mounting hardware 42 is provided to be relatively movable with respect to the slits 36, 38. For this reason, when the bag body 28 (i.e., the expanding portion 32) inflates in a state of being supported by the wire 40, the bag body 28 is suitably moved along the mounting hardwares 42 in accordance with the internal pressure generated within the expanding portion 32. As a result, tensile force acting in the longitudinal direction of the bag body 28 due to the internal pressure when inflating becomes uniform and the bag body 28 can reliably inflate to expand smoothly in accordance with the predetermined expanding progress.

As described above, the air bag device 10 of the present invention is constructed in that the bag body 28 is continuously supported by the wire 40 over the entire region thereof in the longitudinal direction, and therefore, the tensile force acting in the longitudinal direction of the bag body 28 when inflating can be made uniform as a whole, and the bag body 28 can reliably inflate to expand smoothly in accordance with the predetermined expanding progress.

Further, since the structure provided by the present invention is such that the bag body 28 is supported by the wire 40 and the wire 40 is supported by the plurality of mounting hardwares 42, the bag body 28 can reliably be supported continuously by a small number of members over the entire region thereof in the longitudinal direction, thereby resulting in sharp reductions in costs of parts and in the number of mounting processes.

In addition, since the mounting hardwares 42 are each provided to be relatively movable with respect to the slits 24, 26 of the cover 14 and the slits 36, 38 of the bag body 28 (i.e., the cylindrical portion 34), it is possible to suitably move the mounting hardwares 42 at the time of the mounting operation in accordance with the positions at which the mounting hardwares 42 are mounted, the positions being set in correspondence with the shape of the vehicle body 12, i.e., the entire shape of the front pillar 16, the roof side 20, and the center pillar 18. For this reason, it is not necessary to strictly determine a positional tolerance of a portion of the mounting hardware 42 to be mounted on the side of the vehicle body 12 (i.e., a screw hole or the like by which the bolt 50 is mounted on the vehicle body 12), and the cover 14, the bag body 28, and the like can also be applied to a vehicle body of a different shape. As a result, sharp reduction in cost can be achieved.

Meanwhile, the structure provided by the present embodiment is such that the slits 24, 26, 36 and 38 are formed in the cover 14 and in the bag body 28 and the mounting hardwares 42 are provided to be relatively movable with respect to these slits 24, 26, 36 and 38 so that the tensile force of the bag body 28 when inflating is made uniform. However, the structure by which the tensile force of the bag body 28 is made uniform is not limited to the same. For example, in the same way as in a bag body of a conventional air bag device, there can also be used a structure in which a tongue-shaped mounting portion is merely formed in a bag body, a mounting member having a predetermined elasticity is interposed between the mounting portion and a vehicle body, and when inflating the bag body is moved in the longitudinal direction thereof against elasticity of the mounting member.

What is claimed is:

1. An air bag device comprising:
    a bag body having an elongated configuration that defines a longitudinal axis, the bag body disposed on an inner side of a vehicle body, the bag body inflating to be elongated in the longitudinal direction due to pressure of gas blown into the bag body; and
    a bag body supporting portion which movably supports said bag body with respect to the vehicle body so that said bag body can be moved relative to the vehicle body in a predetermined range in the longitudinal direction prior to and during inflation of the bag body.

2. An air bag device according to claim 1, wherein said bag body includes first slits formed along a longitudinal direction of said bag body, and said bag body supporting portion includes:
    a wire of which both end portions are fixed to the vehicle body and which supports said bag body continuously along the longitudinal direction of said bag body; and
    a mounting member passing through the first slits so as to be relatively movable with respect to said bag body along the first slits and holding said wire within said bag body so that said wire is relatively movable, the mounting member being fixed to the vehicle body in such a manner as to project out of said bag body.

3. An air bag device according to claim 2, wherein said bag body includes:
    an expanding portion which expands due to pressure of gas; and
    a cylindrical portion which is formed continuously from said expanding portion via a sewn-together portion and is opened at both end portions in a longitudinal direction of said bag body.

4. An air bag device according to claim 3, wherein said cylindrical portion includes the first slits.

5. An air bag device according to claim 4, wherein said wire is disposed within said cylindrical portion.

6. An air bag device according to claim 5, further comprising:
    a cover which has an elongated configuration and is disposed on an inner side of the vehicle body, the cover being provided to accommodate said expanding portion in a folded state.

7. An air bag device according to claim 6, wherein said cover includes second slits formed along a longitudinal direction of said cover.

8. An air bag device according to claim 7, wherein said mounting member passes through the second slits.

9. An air bag device according to claim 8, wherein each dimension of the first slits and the second slits in the longitudinal direction thereof is made greater than a dimension of said mounting member along the longitudinal direction of the first slits and the second slits.

10. An air bag device according to claim 9, wherein said cover includes a notching portion which allows inflation of said expanding portion when said expanding portion inflates.

11. An air bag device comprising:

a bag body having an elongated configuration and disposed on an inner side of a vehicle body, the bag body inflating to be elongated in a predetermined direction due to pressure of gas blown into the bag body, and said bag body including first slits formed along a longitudinal direction of said bag body; and a bag body supporting portion which supports said bag body with respect to the vehicle body so that said bag body can be moved in a predetermined range, said bag body supporting portion including a wire of which both end portions are fixed to the vehicle body and which supports said bag body continuously along the longitudinal direction of said bag body and a mounting member passing through the first slits so as to be relatively movable with respect to said bag body along the first slits and holding said wire within said bag body so that said wire is relatively movable, the mounting member being fixed to the vehicle body in such a manner as to project out of said bag body.

12. An air bag device according to claim 11, wherein said bag body includes:

an expanding portion which expands due to pressure of gas; and a cylindrical portion which is formed continuously from said expanding portion via a sewn-together portion and is opened at both end portions in a longitudinal direction of said bag body.

13. An air bag device according to claim 12, wherein said cylindrical portion includes the first slits.

14. An air bag device according to claim 13, wherein said wire is disposed within said cylindrical portion.

15. An air bag device according to claim 14, further comprising:

a cover which has an elongated configuration and is disposed on an inner side of the vehicle body, the cover being provided to accommodate said expanding portion in a folded state.

16. An air bag device according to claim 15, wherein said cover includes second slits formed along a longitudinal direction of said cover.

17. An air bag device according to claim 16, wherein said mounting member passes through the second slits.

18. An air bag device according to claim 17, wherein each dimension of the first slits and the second slits in the longitudinal direction thereof is made greater than a dimension of said mounting member along the longitudinal direction of the first slits and the second slits.

19. An air bag device according to claim 18, wherein said cover includes a notching portion which allows inflation of said expanding portion when said expanding portion inflates.

* * * * *